United States Patent [19]

Glasser

[11] Patent Number: 4,471,358

[45] Date of Patent: Sep. 11, 1984

[54] RE-ENTRY CHAFF DART

[75] Inventor: Alan Glasser, South Acton, Mass.

[73] Assignee: Raytheon Company, Lexington, Mass.

[21] Appl. No.: 270,497

[22] Filed: Apr. 1, 1963

[51] Int. Cl.3 .................... G01S 7/38

[52] U.S. Cl. .................... 343/18 B; 102/501; 102/505; 244/3.23; 343/792.5

[58] Field of Search .................... 343/18, 792.5, 18 B, 343/792.5, 18 E; 102/2, 49-51, 92.5, 439, 501, 505; 244/3.23

[56] References Cited

U.S. PATENT DOCUMENTS

| | | | |
|---|---|---|---|
| 2,436,578 | 2/1948 | Korn et al. | 343/18 B |
| 2,480,154 | 8/1949 | Masters | 343/795 |
| 2,485,870 | 10/1949 | Edson | 244/3.23 |
| 2,805,065 | 9/1957 | Cotton | 343/18 C |
| 2,823,376 | 2/1958 | Baldwin et al. | 244/3.23 |
| 2,957,417 | 10/1960 | Musgrave | 343/18 E |
| 2,960,035 | 11/1960 | Burton | 244/3.21 |
| 2,984,835 | 5/1961 | DuHamel et al. | 343/792.5 |
| 2,989,749 | 6/1961 | DuHamel et al. | 343/792.5 |
| 3,005,986 | 10/1961 | Reed | 343/810 |
| 3,013,268 | 12/1961 | DuHamel et al. | 343/792.5 |
| 3,015,991 | 1/1962 | Forbes, Jr. | 102/377 |
| 3,025,524 | 3/1962 | Thies | 343/795 |
| 3,056,960 | 10/1962 | Wickersham, Jr. | 343/792.5 |
| 3,059,234 | 10/1962 | DuHamel et al. | 343/792.5 |
| 3,095,162 | 6/1963 | Keon | 244/163 |
| 3,110,030 | 11/1963 | Cole, Jr. | 343/792.5 |

*Primary Examiner*—Harold J. Tudor

*Attorney, Agent, or Firm*—Philip J. McFarland; Joseph D. Pannone

[57] ABSTRACT

Chaff for protecting a ballistic missile from detection by radar during re-entry into the atmosphere is shown to be made up of a plurality of dart like elements, each fabricated from pyrolytically formed graphite and shaped so as to follow a ballistic path through the atmosphere upon release from said missile and to appear as a resonant dipole to interrogating signals from a radar.

6 Claims, 9 Drawing Figures

REAR VIEW

FRONT VIEW

FIG. 9
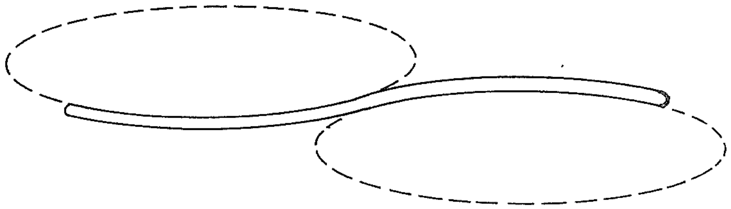
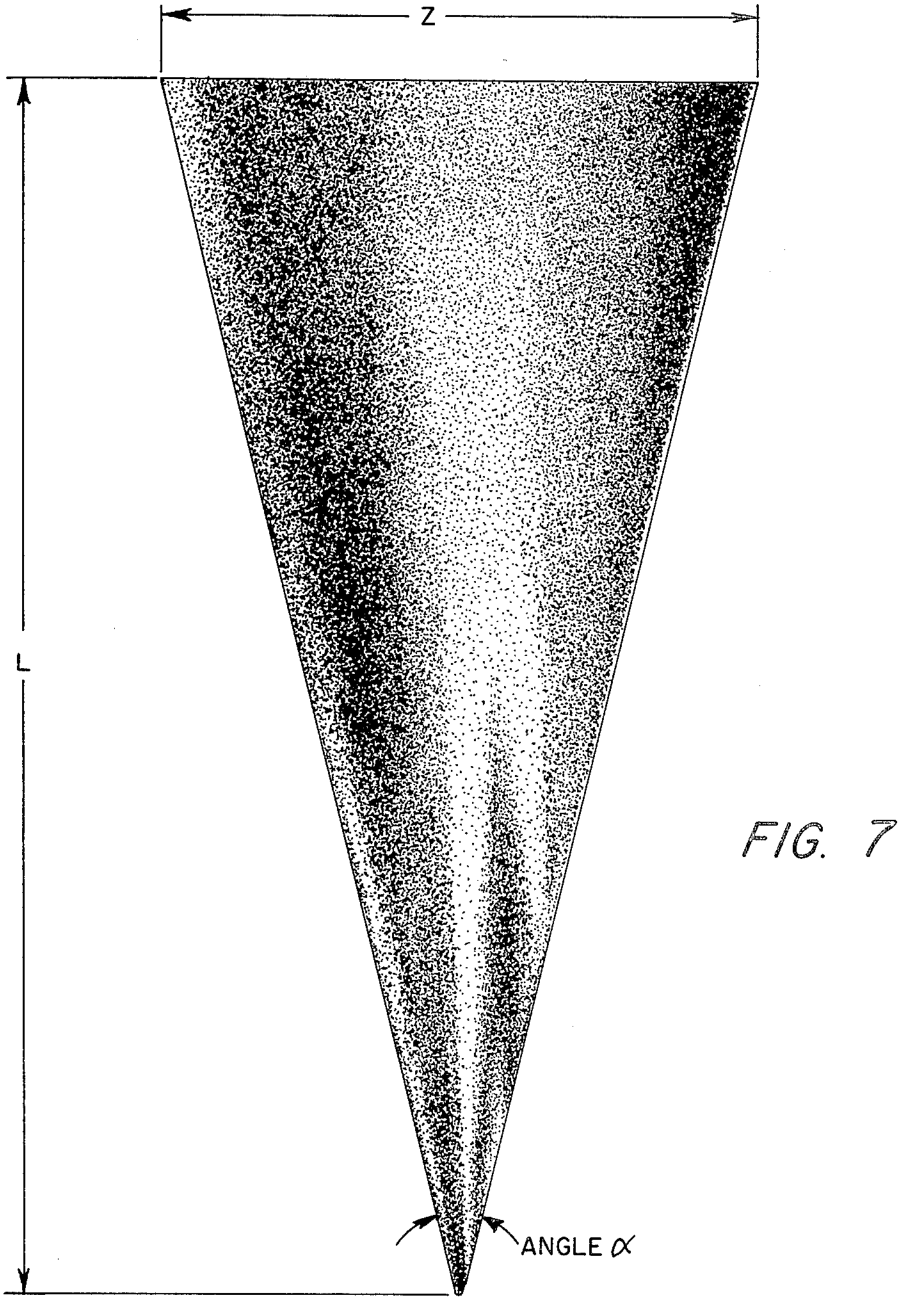
FIG. 7

RE-ENTRY CHAFF DART

This invention relates to counter measures and more particularly to devices for concealing re-entry nose cones or warheads from detection.

In the past, various types of aircraft have used chaff to camouflage their presence while making an approach to certain targets. The chaff has been of several styles, though in general all of the same type. It generally consisted of thin metal strips, cut into various lengths to give broadband coverage at minimum weight, each piece of chaff being a resonant dipole at some particular frequency. With the advent of the space age, chaff has been considered for the application of concealing a re-entry nosecone or warhead. However, there are certain inherent limitations to this use. The first is that if the chaff is spread in space to cover the warhead, the job must be accomplished by separately placing each piece of chaff in the cloud, since there is no air to do the scattering the weight required for the system to distribute this type of chaff has made its general use prohibitive. Certain systems have been developed, to be sure, that promise to distribute chaff at a reasonable weight; however, when we consider the fact that the warheads will be fired in salvos and the huge volumes of space that must be filled, it can be seen that this form of chaff is not really practical. Even if it were possible to spread the millions of dipoles required, during re-entry these dipoles would very quickly do one of two things. First, they would be destroyed in the atmosphere. Secondly, they would very quickly fall behind the warhead and be range-gated out of the radar display. Either range-gating or acceleration-gating due to the aerodynamic drag of the dipoles is a feasible means for defeating this type of chaff. A second class of chaff has been developed recently, this being of a limited re-entry type. The extent to which this type of chaff is effective, is dependent upon the ballistic coefficient that can be developed. This chaff consists of needles, cut to the resonant length of the particular frequency that it is desired to defeat. The re-entry characteristics of this type of chaff, for a reasonable weight, are very poor, since the highest ballistic coefficients that can be developed with needles are of the order of five to ten pounds per square foot, whereas the warheads are commonly over several hundred pounds per square foot. Even at these low ballistic coefficients, a very limited number of pieces of chaff can be packed into a reasonable size container and properly distributed. Several hundred resonant tungsten needles make up a reasonable size chaff package. These needles have the further disadvantage in that they will generally tumbel, be partially misoriented, scintillate, and perhaps be of the order of thirty percent effective. Further, the ballistic coefficient is still quite low compared to a warhead and these types of resonant needle chaffs will be subject to both acceleration and range-gating.

At the other end of the passive decoy picture is the class of re-entry darts. These devices are quite sophisticated models of the re-entry vehicle to the extent of attaining passive simulation of the various observables. For example, a modern decoy is designed to have the same ballistic coefficient as the re-entry vehicle, the same radar return, and of late additional capability has been added to yield the same wake characteristics of the re-entry vehicle. In order to achieve these objectives, the decoy must grow until it is a sizable fraction of the warhead weight and volume. Because of this, very few really satisfactory decoys can be carried with the re-entry vehicle. Since a modern defensive system can have as high as 30 engagements at the same time, there must be at least this many decoys to achieve even a limited kill probability.

Somewhere between the extreme simplification of the chaff and the ultra-sophistication of the passive-wake simulating decoy, there is a middle-ground (i.e. a device that is heavier than single pieces of chaff yet orders of magnitude less in weight than the decoy), a device that will stimulate all of the re-entry observables with sufficient accuracy that, if used properly, will yield a high probability of penetration at a reasonable weight.

Accordingly, it is an object of this invention to provide a light weight aerodynamically stable device which simulates the characteristic of a re-entry vehicle when penetrating the atmosphere.

Furthermore, it is an additional object to provide a device having the following advantages: a high ballistic coefficient which approximates that of a re-entry vehicle; a broadband reflecting surface; deep penetration into the atmosphere; light weight; easily storable in a re-entry vehicle; stable with substantially low scintillation; and moderate wake simulation.

In accordance with this invention, a device having the characteristics of a re-entry vehicle is provided wherein the device has a ballistic coefficient which approximates that of a re-entry vehicle, has a relatively thin low weight body, has a surface with substantially electromagnetic reflectivity characteristics of a re-entry vehicle, is constructed of a material which enables it to re-enter and penetrate the atmosphere without disintegrating, and is stabilized upon re-entry by its tapered screw-like elongated relatively flat construction which allows it to spin during its travel through the atmosphere.

FIG. 7 is a top view of the device of FIG. 1;

FIG. 9 is a curvalinear representation of curvature of the rear portion of the device.

Figure 1:
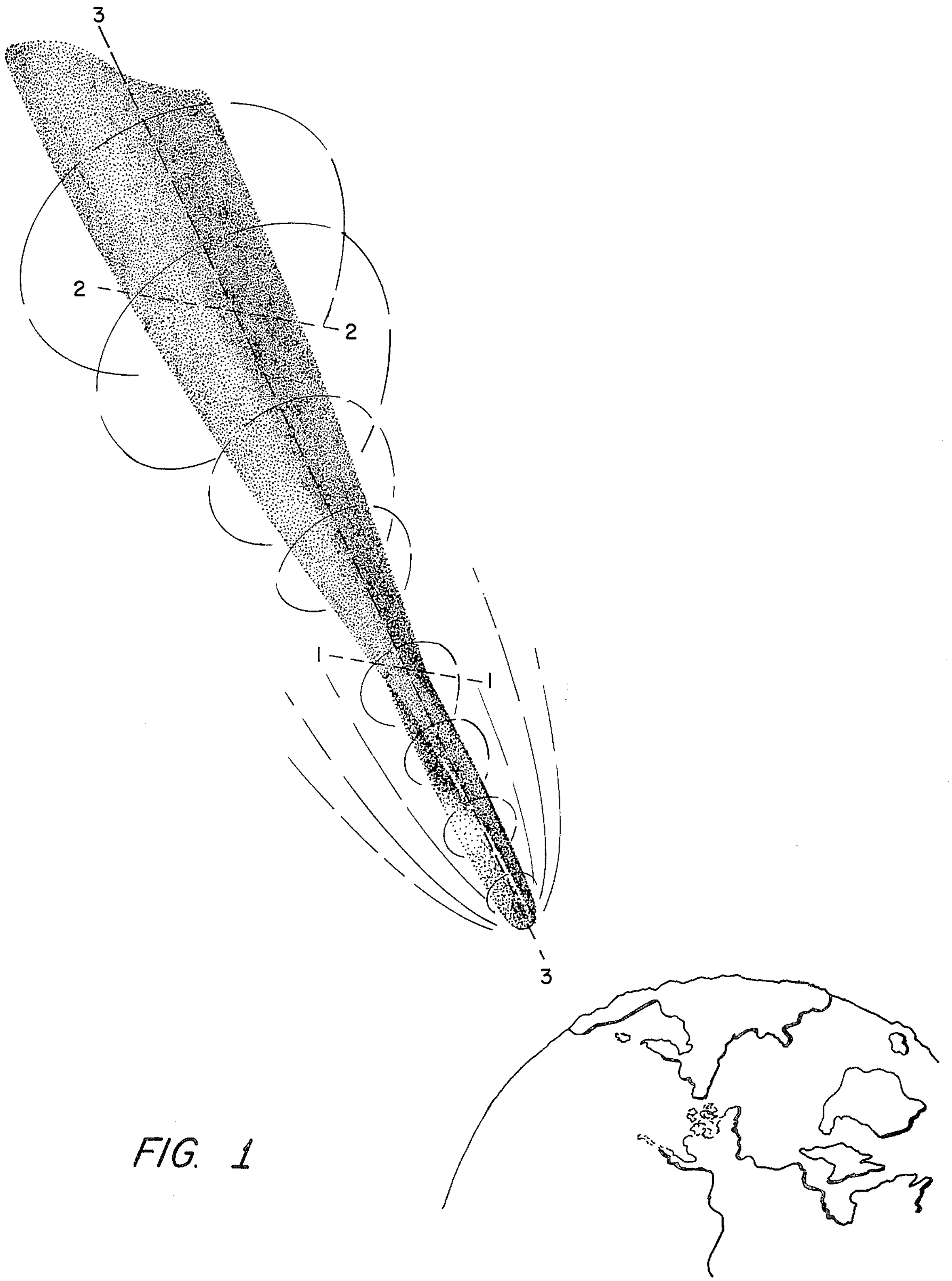
FIG. 1 is a pictorial view of a counter measures device having the characteristics of a re-entry vehicle.
Figure 5:
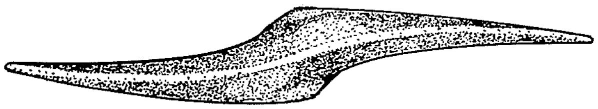
FIG. 5 is a rear view of the device of FIG. 1.
Figure 4:
FIG. 4 is a cross-section taken along line 2—2 of FIG. 1.
Figure 3:
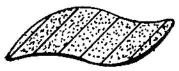
FIG. 3 is a cross-section taken along line 1—1 of FIG. 1.
Figure 2:
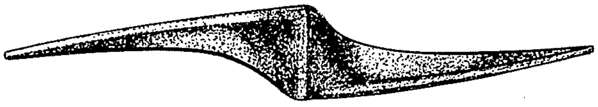
FIG. 2 is a front view of the device of FIG. 1.
Figure 6:
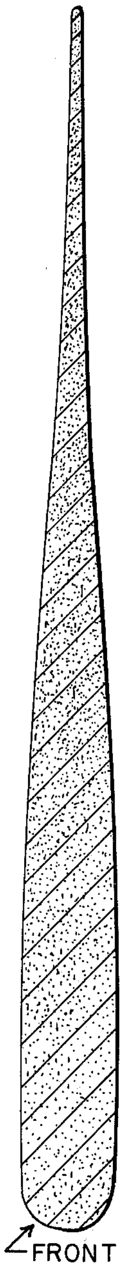
FIG. 6 is a cross-section taken along line 3—3 of FIG. 1.

Referring now to FIG. 1, the dart device of this invention is shown in pictorial form to exhibit its flight into the atmosphere after it has been ejected from a re-entry vehicle to disrupt and confuse enemy radar detection devices. The dart device is shown spinning into the atmosphere to provide a device which is aerodynamically stable and has low scintillation and a moderate degree of weight simulation in comparison with that of a re-entry vehicle. It is seen from FIG. 1 that the device has a reflecting surface large enough to act as a broadband reflector of enemy radar frequencies, thus simulating the radar reflectivity of a re-entry vehicle. Additionally, the dart device is shown having transverse concave and convex portions each of which extends along its length, thus imparting a screw-like or spiral effect to the dart device upon its re-entering the atmosphere. Referring now to FIG. 2, there is shown a front view of the dart device of FIG. 1. Referring now to FIG. 3, there is shown a cross-sectional area along line 1—1 of FIG. 1 to show the curvature and the thickness of the dart device at this point along the length of the body. Referring now to FIG. 4, there is shown a cross-sectional area taken at line 2—2 which is somewhat further along the length of the body starting from the front of the dart device to show both the change in the curvature of the upper and lower surfaces and the gradual thinning of the body. Referring now to FIG. 5, there is shown a rear view to show the change in curvature of the upper and lower surfaces of the dart device body and furthermore to show the tapering of the body from the rear to the front of the device. In FIG. 6, there is shown a cross-sectional area of the dart device body taken along line 3—3 of FIG. 1 to show the tapering of the dart device from front to rear. Referring now to FIG. 7, there is shown a top view of the device of FIG. 1 to show by way of shading the convex and concave areas on the upper surface of the body which imparts a screw-like spinning or spiraling effect to the device when the device re-enters the atmosphere.

In accordance with the preferred embodiment of this invention; the body of the device of FIG. 1 is constructed of a lightweight material having thermal anisotropic properties, such that the material exhibits high heat conductivity in an orthogonal direction to the surface of the device. In particular, the device of FIG. 1 is constructed of a pyrolytically-formed graphite material which provides the desired thermal properties or alternatively may comprise a suitable substrate such as graphite with a deposit of pyrolytically-formed graphite thereon. Additionally, other embodiments may include dart bodies made of other material such as a metallic strip coated with transparent ablative material such as quartz. This dart device due to the type of material used will not disintegrate upon re-entry into the atmosphere, but its body will instead gradually ablate. Additionally, the device being constructed of pyrolytically-formed graphite exhibits superior reflectivity characteristics off the surface of the body. For more complete explanation of the properties of pyrolytically formed pyrographite, see Electronic Progress, May--June 1960, published by Raytheon Company and copyrighted in 1960.

It is to be noted that this device provides a pyrolytically formed decoy which not only is capable of re-entry, but is lightweight and thus can be fired in a cluster from a warhead or re-entry vehicle. Additionally, due to the shape of the dart device, the device can be easily stored in great numbers and can be shot out in a single cluster or successively to deceive radar detecting systems. Furthermore, the dart device being constructed of pyrographite provides a device having good reflectivity characteristics while at the same time providing the aforementioned heat characteristics.

The technique for constructing the device of the invention with the proper figure dimensions and weight distribution to provide a broadband reflective surface and having an aerodynamic stable body is best described with reference to FIG. 7. Assume that the frequency of the radar system that is to be cluttered or deceived is 1000 m.c. and furthermore, the re-entry vehicle that is to be simulated has a ballistic coefficient approximately equal to 1000 lbs./ft.$^2$ and has a radar reflective area of approximately 0.02 sq. meters.

To simulate the 0.02 square meter reflective area exhibited by a re-entry vehicle, it is necessary that the device be constructed of a body having the proper dimensions such that the body will act as a resonant structure to the particular frequencies which can be expected to be emitted by the radar detecting devices. More particularly, it is possible to electrically dimension the device of the invention utilizing the techniques described in Chapter 13 of the Antenna Engineering Handbook by Henry Jasik, Editor, published by McGraw Hill Book Company in 1961. For example, at an expected frequency of 1000 m.c., the dart in order to be an effective reflector should, regardless of its orientation with respect to the location of the particular radar or radars that it is to deceive during its penetration into the atmosphere, exhibit substantially one-half of a wavelength to the frequency that is expected to be used for detection purposes. Thus, with a detection frequency of 1000 m.c. the Z dimension shown in FIG. 7 is determined from the standard relationship between wavelength and frequency. In this particular instance the Z dimension is equal to approximately 5.9 inches.

To determine the length of the dart device and the angle of the device between the two edges of the device shown in FIG. 7, use is made of the equation for the ballistic coefficient which is equal to $\beta=(\omega/C_DA)$, where $\omega$ is equal to the weight of the body of the device, $C_D$ is equal to the drag coefficient of the body and A is the frontal area of the body, that is the area seen looking from the front of the device to the rear of the device, or the front view area. The frontal area could also be described as that area shown in FIG. 2. Also, using the aerodynamic theory disclosed in the book, The Dynamics and Thermodynamics of Compressible Fluid Flow, Vol. 1, by Ascher H. Shapiro, published by the Ronald Press Company in New York City and copyrighted in 1953, and by utilizing an iterative technique, the above-mentioned length and angle of the device of FIG. 7 is determined. The length dimension shown herein is approximately 19 inches and the angle $\alpha$ is approximately 18°. Additionally, the device of FIG. 1 has a weight approximately equal to 0.9 lbs. with a frontal area of approximately 0.0083 square feet and drag coefficient of approximately 0.1. Thus, a ballistic coefficient approximately equal to 1085 is obtained from the above equation which is a good approximation to the assumed ballistic coefficient of 1000 attributed to the aforementioned re-entry vehicle. Furthermore, to determine the taper of the device shown in FIG. 6 it is to be noted that the cross-sectional area of the body of the device is held substantially a constant. Therefore, the taper angle can be determined by graphical techniques. It is also seen that the total weight of the device would be equal to the cross-sectional area times the length times the density of the material used. For example, if pyrolitically formed graphite were utilized which has a density of approximately 0.08 lbs. per cubic inch, a device shown in FIG. 1 is thus provided which has an over-all weight of approximately 0.9 lbs., a length of 19″, and an average cross-sectional area of 0.592 sq. inches.

To obtain the curvature of the device so as to enable the device to develop the torque for spinning or spiraling into the atmosphere to provide stability, it is assumed for the embodiment of FIG. 1 that the ratio of the natural pitch frequency of the device to the spin frequency of the device should be greater than one and also that the ratio of the natural yaw frequency of the device to the spin frequency of the device should be greater than one. It is to be noted that an additional area of stability exists, where both ratios are valued between 0 and 1. To satisfy the above ratios, thereby providing aerodynamic stability, the device of FIG. 1 has been built with convex and concave surface areas. More particularly, a representation of the type of curvalinear surface to provide spin upon re-entry is shown in FIG. 9 wherein two elipses are shown in dotted lines. Portions of the two elipses shown in dark lines could make up the curvalinear surfaces shown in the rear view of FIG. 5 or the sections shown in FIGS. 3 and 4. From the above explanation, a device or craft has been described having the following dimensions which are summarized below:

1. Weight≈0.9 lbs.
2. $C_D \approx 0.1$
3. $\beta \approx 1085$ lbs./ft.$^2$
4. $Z \approx 5.9''$
5. $L \approx 19''$
6. $<\alpha \approx 18°$
7. Material comprising pyrolytically formed pyrographite.

Figure 8:
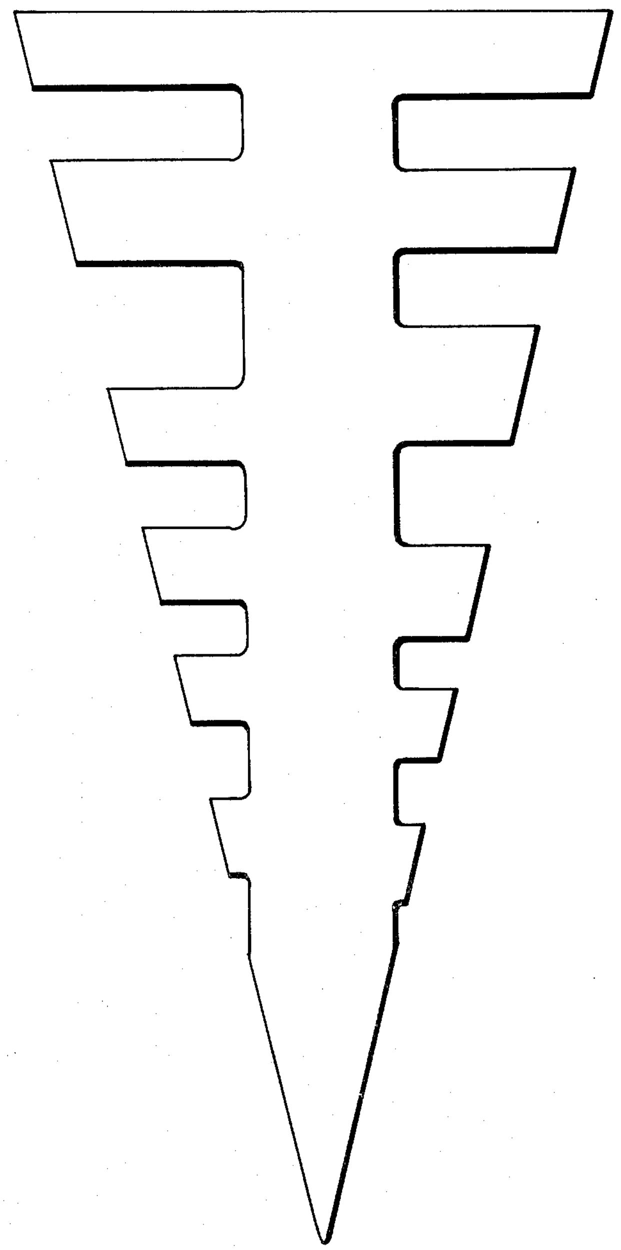
FIG. 8 is a top view of another embodiment of the edges of the device of FIG. 1 to provide broadband electromagnetic reflectivity approximating that of a re-entry vehicle.

Referring now to FIG. 8, there is shown another embodiment of a decoy device having a different reflective area configuration than the device of FIG. 1 to provide broadband electromagnetic reflectivity approximating the reflecting characteristics of a re-entry vehicle. In particular, the device of FIG. 8 is cut to the dimensions of a log periodic antenna array for the purpose of providing a radiation pattern which will remain constant over large changes in detection frequencies. Antennas of this type are disclosed in U.S. Pat. No. 2,984,835, Broadside Antenna Arrays, R. H. DuHamel et al. and in U.S. Pat. No. 3,059,234, Logarithmically Periodic Antenna Array, R. H. DuHamel et al. Using this general configuration, it is then possible to construct a re-entry craft of the type shown in FIG. 1 having its body portion composed of a high temperature material to permit re-entry.

It is to be understood that the above-described embodiments are illustrative of the principles of the invention. Accordingly, it is desired that the invention not be limited to the particular details or dimensions shown for the embodiments disclosed herein except as defined in the appended claims.

What is claimed is:

1. A relatively thin triangular decoy body for confusing detection devices emitting detection frequencies by simulating both the aerodynamic and electromagnetic reflective characteristics of a re-entry vehicle, said decoy body having curvilinear surface areas for permitting said decoy body to spin about an axis passing from the front to rear of said decoy body and a ballistic coefficient approximating that of said re-entry vehicle, said body having at least a portion constructed of a material having ablative characteristics to permit penetration into the atmosphere, and said body haivng a reflector of the frequencies emitted from said detection devices.

2. A relatively thin triangular decoy device being constructed of a material that exhibits high heat conductivity in one direction and a low heat conductivity in an orthogonal direction, said device having a relatively low weight body, and said device having concave and convex surface areas for imparting spin.

3. A relatively thin triangular decoy having portions comprising a reflective surface, said reflective surface defining a log periodic function, and an ablative layer in contact with said reflective surface, said ablative layer including curvilinear surface areas for providing spin to said decoy about an axis passing through said decoy.

4. A leaf-like, triangular decoy for simulating both the aerodynamic and reflective characteristics of a re-entry vehicle including a body having a ballistic coefficient approximating the ballistic coefficient of said re-entry vehicle, said body having reflective surfaces which simulate the reflective characteristics of said re-entry vehicle, and a portion of said reflective area being substantially one-half of a wavelength in length at a predetermined detection frequency.

5. A log periodic antenna shaped decoy comprising an ablative layer having the shape of a log periodic antenna and a reflective surface, said reflective surface defining a log periodic function.

6. The invention according to claim 5 and wherein: said ablative layer includes means for providing spin to said decoy about an axis passing through said decoy.

* * * * *